United States Patent

Woody et al.

[11] Patent Number: 5,964,688
[45] Date of Patent: Oct. 12, 1999

[54] LINEAR CLAMPING ASSEMBLY FOR BAG SEALING MACHINES

[76] Inventors: Clark M. Woody, 1585 N. Mackinaw, Pinconning, Mich. 48650; Robert J. Nestle, 1814 N. Golfview #3, Essexville, Mich. 48732; Michael J. Staszak, 2152 Parish Rd., Kawkawlin, Mich. 48631

[21] Appl. No.: 09/094,757

[22] Filed: Jun. 15, 1998

Related U.S. Application Data

[60] Provisional application No. 60/049,920, Jun. 18, 1997.

[51] Int. Cl.$^6$ ........................................... B31B 1/64
[52] U.S. Cl. ..................... 493/207; 493/205; 493/206; 493/208; 493/209
[58] Field of Search ..................... 493/207, 209, 493/205, 206, 371, 372, 208

[56] References Cited

U.S. PATENT DOCUMENTS

| | | |
|---|---|---|
| 2,405,675 | 8/1946 | Southwick, Jr. et al. . |
| 2,759,090 | 8/1956 | Frye . |
| 3,708,636 | 1/1973 | Sobchak ................................. 200/6 A |
| 3,854,554 | 12/1974 | Wilcox ................................... 188/322 |
| 4,510,957 | 4/1985 | Frank ...................................... 135/84 |
| 4,692,135 | 9/1987 | Johnson ................................. 493/394 |
| 4,790,681 | 12/1988 | Buhl ...................................... 403/134 |
| 4,820,254 | 4/1989 | Ziegelhoffer . |
| 5,019,027 | 5/1991 | Boeckmann et al. ................... 493/209 |
| 5,127,573 | 7/1992 | Chang et al. . |
| 5,176,028 | 1/1993 | Humphrey . |
| 5,211,619 | 5/1993 | Ziegelhoffer . |
| 5,830,391 | 11/1998 | Lamkemeyer et al. ................ 264/40.1 |

FOREIGN PATENT DOCUMENTS

| | | |
|---|---|---|
| 0 460 518 A1 | 12/1991 | European Pat. Off. . |
| 1146591 | 11/1957 | France . |
| 1527028 | 10/1968 | France . |
| 2 261 121 | 9/1975 | France . |
| 2 749 786 | 12/1997 | France . |
| 30 18 629 A1 | 11/1981 | Germany . |

Primary Examiner—Joseph J. Hail, III
Assistant Examiner—William Hong

[57] ABSTRACT

A seal bar assembly which includes a support structure (21), and at least a first seal bar segment (22) and a second seal bar segment (23) mounted substantially parallel to each other on the support structure. The seal bar segments define a gap (28) therebetween. Each seal bar segment has two ends, with mounting means (26) positioned proximate to each end of both the first and second seal bar segments for mounting the ends of the seal bar segments to the support structure. The mounting means are adapted to permit one or both ends of each seal bar segment to move toward or away from the support structure, but the mounting means do not permit the seal bar segments to significantly move transversely with respect to each other. In this manner, the seal bar segments remain substantially parallel to each other, and the gap between the seal bar segments is maintained substantially constant.

4 Claims, 3 Drawing Sheets

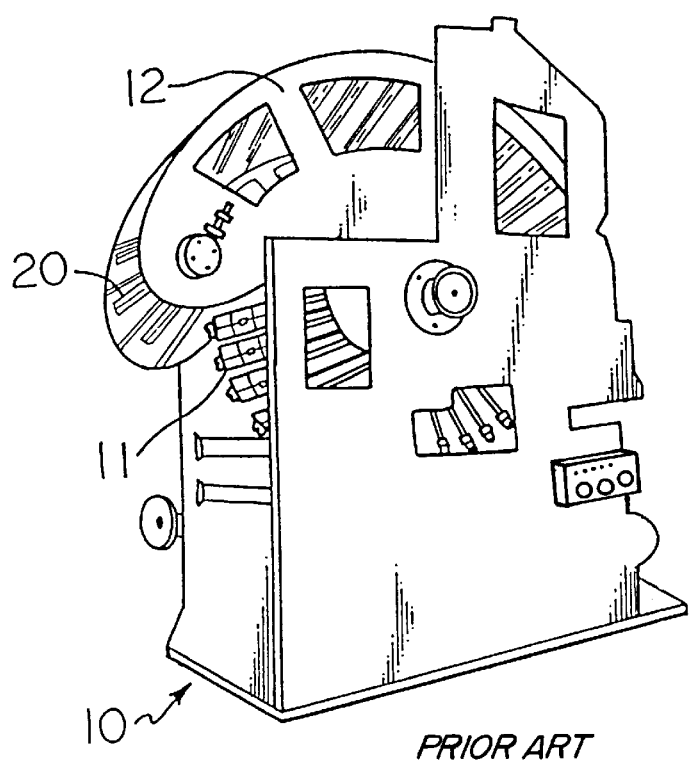
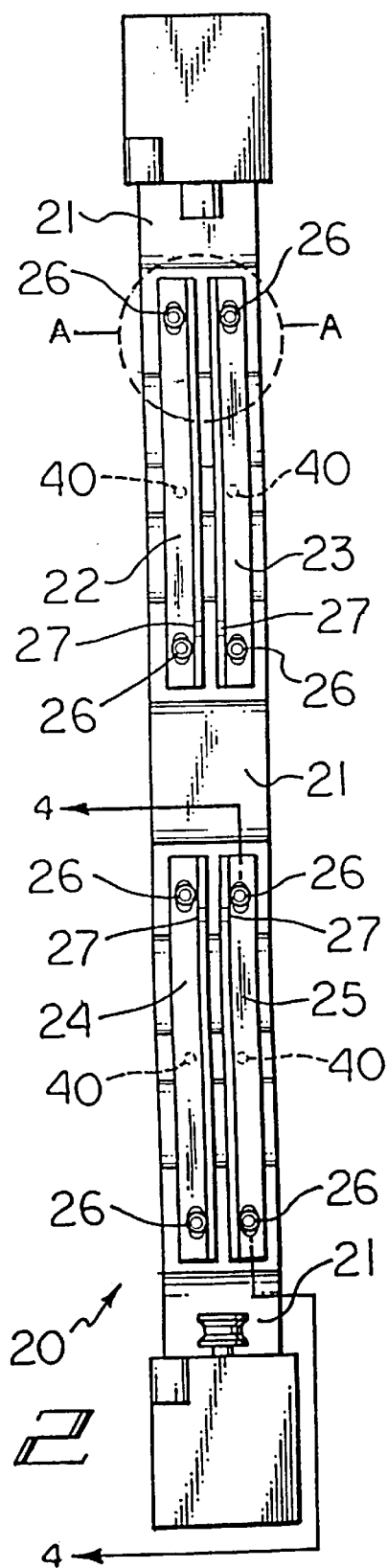
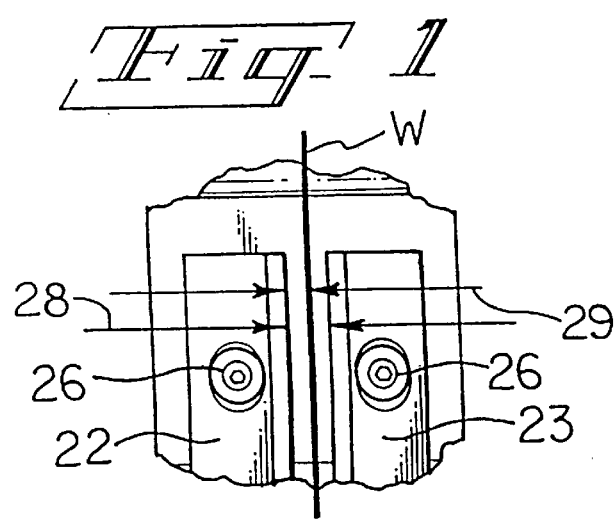
Fig. 1 PRIOR ART
Fig. 2A
Fig. 2

LINEAR CLAMPING ASSEMBLY FOR BAG SEALING MACHINES

This application claims the benefit of U.S. Provisional Application No. 60/049,920, filed on Jun. 18, 1997.

TECHNICAL FIELD

In the manufacture of reclosable thermoplastic bags, bag sealing machines are commonly used to cut the bags apart and simultaneously form the side seals along the edges of the bags. Typically, bag sealing machines have a rotating drum and a track assembly designed to work together with the rotating drum. The track assembly includes clamping devices which travel around the track assembly and are designed to clamp a web of thermoplastic film between the drum and the track. Each clamping device has two opposing seal bars which actually contact the film. The seal bars have a defined gap or clearance therebetween.

BACKGROUND OF THE INVENTION

Once the thermoplastic film is held in place against the drum, and as the drum rotates, an electrically-heated hot wire or hot knife comes out of the drum, cuts through the film, and moves into the gap between the seal bars in order to seal and form the sides of the bag. In order to ensure that the film is cut and sealed, the gap between the seal bars must be large enough to enable the hot wire or hot knife to pass through the film.

The seal bars cannot be fixed in place. Rather, the seal bars must have a little "give", because the machine must be able to compensate for inconsistencies in the seal drum surface and movement of the seal drum while at the same time ensuring that the film is clamped between the clamping assembly and the seal drum.

A slight "give" is provided for in the prior art. U.S. Pat. No. 4,820,254 describes a clamping mechanism which has two seal bar segments defining a gap therebetween, whereby the seal bar segments could pivot toward one another. However, when the seal bar segments pivot toward each other, the gap between seal bar segments can become too small. Since the wire is electrically heated, if the gap is so narrow that the wire contacts a surface of a seal bar segment, the wire can short out and shut down the entire bag-making operation.

U.S. Pat. No. 5,211,619 describes a modest improvement. That patent describes a channel with a small clearance built in to permit the seal bar segments to pivot not only with respect to each other, but also with respect to the seal drum. However, the amount of pivoting is very low—0.025" to 0.050". With such a small amount of pivoting to compensate for drum movement, the clearances are very small and tedious precision is required to align all of the pieces. Thus, installation of such a seal bar is time consuming and tedious.

It would be an advance in the art of bag sealing devices if a clamping mechanism were invented which would preserve the gap between the seal bar segments while at the same time allowing adequate "give" between the clamping device and the seal drum. At the same time, it would be an advance in the art of bag sealing devices if a clamping apparatus were invented which would be self-aligning, so that the clamping assembly is efficient to install.

SUMMARY DISCLOSURE OF INVENTION

The present invention addresses the above identified problems, providing a clamping assembly which preserves the hot wire/hot knife gap while at the same time avoids tedious alignment and assembly due to low tolerances.

The present invention is a seal bar assembly, comprising a support structure; at least a first seal bar segment and a second seal bar segment mounted substantially parallel to each other on the support structure, such that the seal bar segments define a gap therebetween, each seal bar segment having two ends; mounting means positioned proximate to each end of both the first and second seal bar segments for mounting the ends of the seal bar segments to the support structure; wherein the mounting means are adapted to permit one or both ends of each seal bar segment to move toward or away from the support structure, and wherein the mounting means do not permit the seal bar segments to significantly move transversely with respect to each other, such that the seal bar segments remain substantially parallel to each other, and the gap between the seal bar segments is maintained substantially constant.

DESCRIPTION OF THE DRAWINGS

FIG. 1 is a plan view of a bag making machine which uses the clamping assembly of the present invention.

FIG. 2 is a top view of a clamping assembly of the present invention.

FIG. 2A is a detailed view of FIG. 2, which shows two seal bar segments defining a gap therebetween.

BEST MODE FOR CARRYING OUT THE INVENTION

Figure 3:
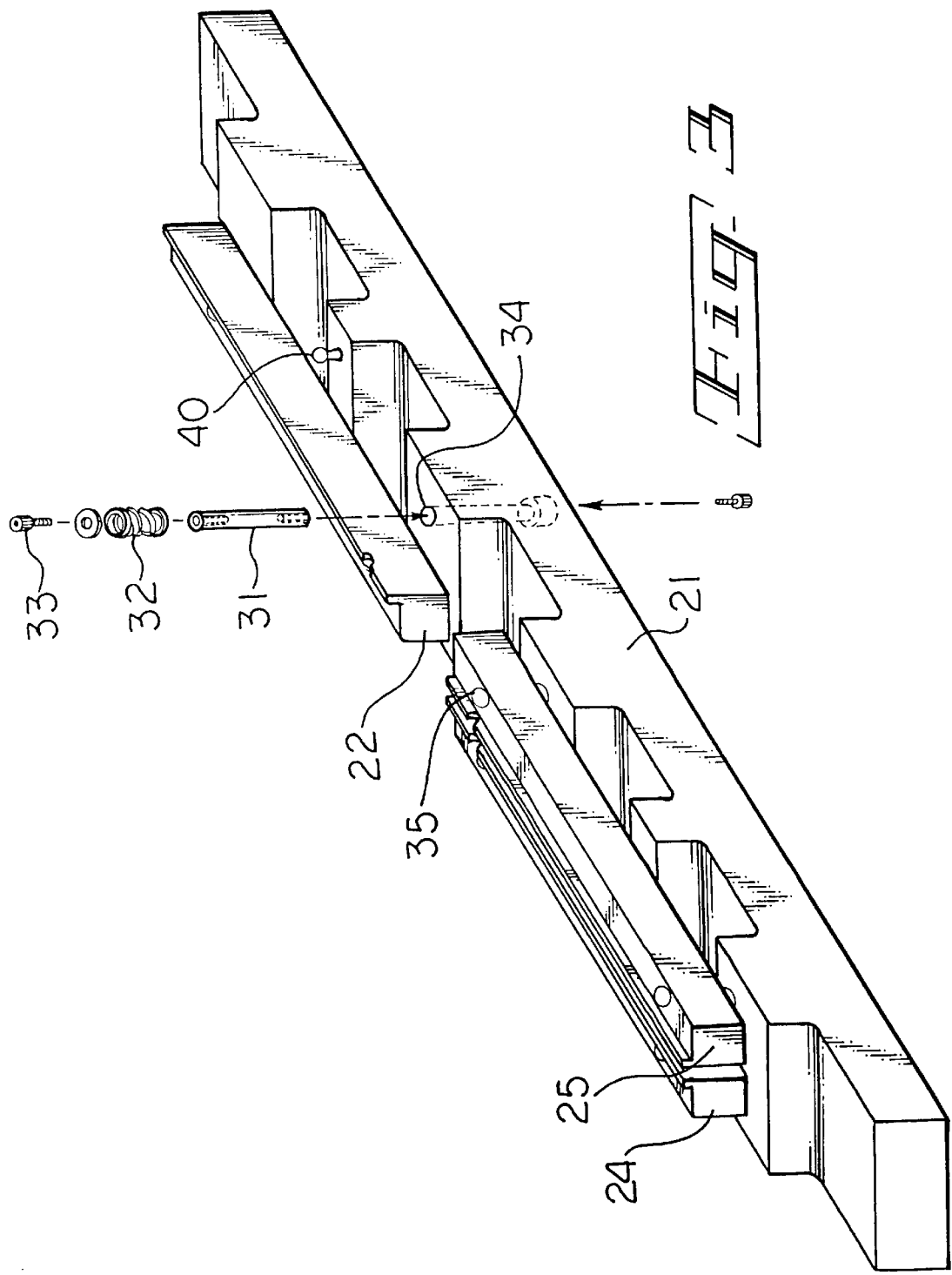
FIG. 3 is an isometric view of a clamping assembly of the present invention.

FIG. 1 illustrates a bag making machine 10 commonly used in the art. The clamping assembly of the present invention can be used in such an apparatus. The machine 10 is designed to hold a folded web of thermoplastic film such that the film can be severed into various segments by a hot wire, a hot knife, or the like. The severing action cuts the web into separate bags and at the same time forms the side edges of the resulting thermoplastic bags. The machine 10 includes a rotating seal drum 11 and a banana-shaped track arrangement 12 which carries a plurality of clamp assemblies 20 adapted to cooperate with the seal drum 11 to immobilize the web during the severing operation.

As illustrated in FIG. 2, each clamping assembly 20 comprises a support structure 21, and at least a first seal bar segment 22 and a second seal bar segment 23. The seal bar segments 22 and 23 are mounted substantially parallel to each other on the support structure 21, such that the seal bar segments 22 and 23 define a gap 28 therebetween, as shown in FIG. 2A. The gap 28 enables a hot wire W to pass between the seal bar segments.

It is conventional practice to provide a multiple width machine such as a 'two-wide' machine so as to develop two streams of bags. Thus, as shown in FIG. 2, a conventional machine would also include seal bar segments 24 and 25 adjacent to seal bar segments 22 and 23. Seal bar segments 24 and 25 would operate in the same manner as seal bar segments 22 and 23. Grooves 27 are preferably notched out of the seal bar segments in order to provide a recess for a plastic zipper closure. Such grooves 27 are desirable so that the zipper closure does not get crushed when the seal bars clamp the film.

The clamping assembly further comprises mounting means 26 positioned proximate to each end of the seal bar segments 22 23 24 and 25 for mounting the ends of the seal bar segments to the support structure 21. The mounting means 26 are adapted to permit one or both ends of each seal bar segment to move in a linear direction, which is defined herein to mean toward and away from the support structure 21. The mounting means 26 are also designed such that they prevent the seal bar segments from significantly moving in a transverse direction. The term "transverse" is defined herein to mean the direction in which the seal bar segments 22 and 23 or 24 and 25 would move closer to each other or farther away from each other, thereby changing the gap 28. Transverse movement is undesirable. Because the mounting means 26 are designed to permit linear movement but to prevent significant transverse movement, the seal bar segments 22 and 23 are maintained substantially parallel to each other, and seal bar segments 24 and 25 are maintained substantially parallel to each other. In this manner, the gap 28 between the seal bar segments is maintained substantially constant.

In the operation of the bag making machine 10, as the hot wire W, shown in FIG. 2A, moves into the gap 28 between the seal bar segments 22 and 23, the heat from the wire W not only severs the film web but also provides a side seal on the edge of the web portion which is to become the side edge of the bag. Thus, it is important to have a gap 28 between the seal bar segments. The gap 28 enables the hot wire W to move between seal bar segments 22 and 23 after passing from the seal drum through the polyethylene web, thereby ensuring that the web is cut and sealed. Thus, the distance defined by gap 28 is critical. The gap 28 must be large enough to enable the hot wire W to pass between the seal bar segments, but the gap 28 must not be so large as to allow for slop in the clamping of the film web. Preferably, the gap 28 is less than 0.200 inches (0.058 cm), more preferably less than 0.175 inches (0.444 cm), and most preferably less than 0.150 inches (0.381 cm). Preferably, the gap 28 is greater than 0.025 inches (0.0635 cm), more preferably greater than 0.050 inches (0.127 cm), and most preferably greater than 0.075 inches (0.190 cm).

The gap 28 results in a space 29 between the hot wire W and the seal bar segment 22. Preferably, space 29 is less than 0.100 inches (0.254 cm), more preferably less than 0.090 inches (0.229 cm), even more preferably less than 0.080 inches (0.203 cm), and most preferably less than 0.070 inches (0.178 cm).

Preferably, space 29 is greater than 0.010 inches (0.0254 cm), more preferably greater than 0.020 inches (0.0508 cm), even more preferably greater than 0.030 inches (0.0762 cm), and most preferably greater than 0.040 inches (0.102 cm).

The mounting means 26 includes a locating pin 31, a spring 32, and a bolt 33, shown in FIG. 3. The locating pin 31 and the spring 32 together will be referred to herein as a spring-loaded locating pin. A hole such as hole 35 is bored into the seal bar segment and a hole 34 is bored into the support structure 21. The locating pin 31 can be press-fitted into the hole 34 or can be bolted to the support structure 21 through the bottom of the support structure 21. Preferably, a bushing provides a liner for hole 35, in order to prevent wear, especially if the seal bar segment is made of a material prone to wear, such as aluminum. The bushing is preferably elliptical and oriented with the longitudinal axis being parallel to the length of the support structure 21. In other words, the bushing is oblong in the direction of the longitudinal length of the seal bar segment 22, so that one end of the seal bar segment 22 can move toward or away from the support structure 21, while the other end remains stationary. The mounting means allows for simply bolting the clamping assembly together, rather than having to manually align the various pieces in a jig which requires tedious precision.

Figure 5:
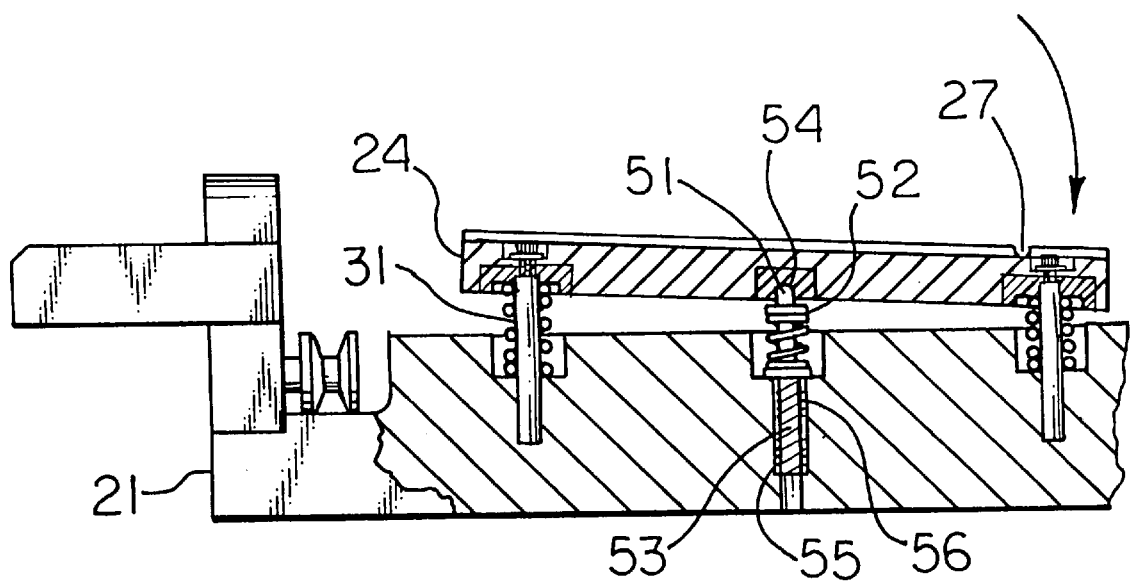
FIG. 5 is a sectional view of a portion of an alternative embodiment of a clamping assembly of the present invention, with one end of a seal bar segment positioned closer to a support structure than the other end.

Each seal bar segment 22 and 23 is preferably equipped with float means 40 which allows the seal bar segments 22 and 23 to pivot or "float" about a single point. Float means 40 is preferably positioned in the center or near the center of each seal bar segment 22 and 23 and extends into the support structure 21. The float means 40 is adapted to prevent the seal bar segment from moving from side to side along the length of the support structure 21, so that the plastic zipper on the web of film remains in the grooves 27. At the same time, float means 40 permits the seal bar segments 22 and 23 to pivot around the float means 40. In this manner, the float means 40, together with mounting means 26, enables the seal bar segments 22 and 23 to move in a linear direction but not substantially in any other direction. For example, FIG. 5 shows one end of seal bar segment 22 being closer to the support structure 21 than the other end, as depicted by the arrow. Thus, the end that is closer to the support structure 21 has moved along the linear plane as defined herein. In this manner, the float means 40 helps to maintain a substantially parallel relationship between the seal bar segments 22 and 23, thereby maintaining the gap 28 substantially constant. The float means 40 also makes it easier to install the seal bar segment. In addition, the float means 40 and mounting means 26 together permit the seal bar segment to be self-aligning with respect to the seal drum, i.e., they permit the seal bar segment to move up and down or pivot as necessary to ensure that the web of film is clamped between the seal bar segment 22 and the seal drum.

Figure 4:
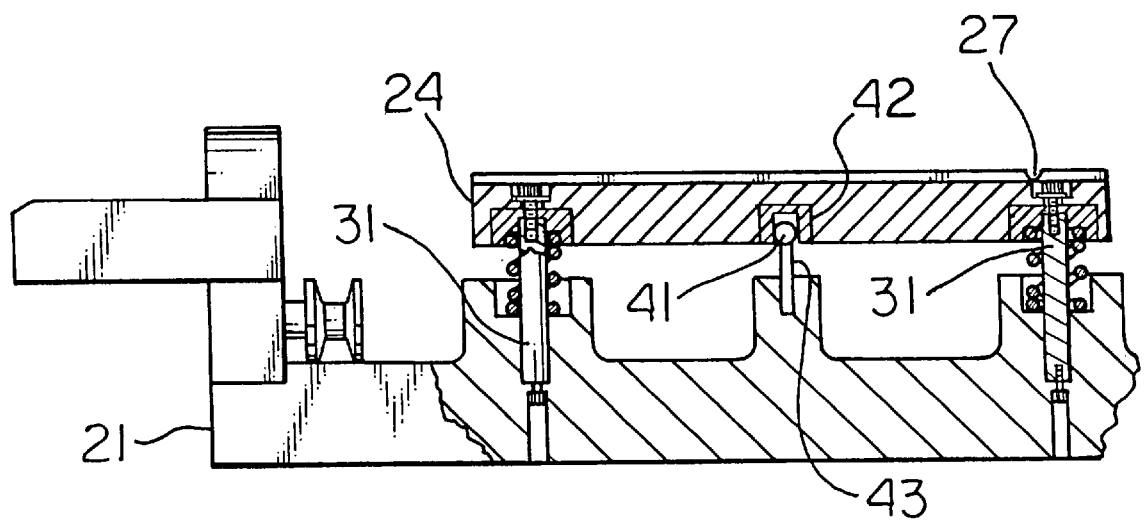
FIG. 4 is a sectional view of a portion of an embodiment of a clamping assembly of the present invention.

As shown in FIG. 4, float means 40 can include a tooling ball 41 extending from the support structure 21. Preferably, the tooling ball 41 is connected to a stationary stem 43 which is press fit into a hole drilled in the support structure 21. A cooperating sleeve 42 is positioned in the seal bar segment 22, preferably in the center or near the center thereof. The sleeve 42 is adapted to receive the tooling ball 41. The sleeve 42 is cylindrical in shape, such that when the tooling ball 41 is inserted into the sleeve, the sleeve can rotate around the tooling ball 41. Thus, the seal bar segment 22 can pivot around the tooling ball 41, enabling one or both of the ends of the seal bar segment 22 to move up and down with respect to the support structure 21.

FIG. 5 shows an alternative embodiment of float means 40. As shown in the embodiment of FIG. 5, float means 40 can include a ball 51 connected to a pin 53 which is inserted into a hole in the support structure 21. Preferably, a bushing 55 and/or bearings 56 line the hole in the support structure 21. Preferably, a spring 52 surrounds pin 53 below the ball 51. The spring 52, ball 51 and pin 53 are together referred to herein as a spring-loaded ball. The bearings 56 permit the spring-loaded ball to move up and down with respect to the support structure 21. A socket 54 is positioned in the seal bar segment 22, the socket 54 adapted to receive the spring-loaded ball. Preferably, the socket 54 is located in the center or near the center of the seal bar segment 22. The spring 51 ensures that the ball 51 maintains contact with the socket 54, so that the seal bar segment 22 can pivot around the ball 51. Thus, the spring loaded ball and socket assembly provides a float means which prevents the seal bar segment from moving from side to side while it enables the seal bar segment 22 to pivot around the ball and socket assembly. In this manner, the ball and socket assembly, together with the mounting means, enables the seal bar segment to move in a linear plane but not in a transverse plane, as shown by the arrow in FIG. 5, thereby providing a self-aligning assembly. That is, the seal bar segment can move up and down or pivot as necessary to ensure that the web of film is clamped between the seal drum and the seal bar segment.

INDUSTRIAL APPLICABILITY

The sealing bars are useful in high speed equipment for the manufacture of thermoplastic bags, particularity recloseable bags.

What I claim is:

1. A sealing bar assembly comprising:

a support structure;

a first sealing bar segment and a second sealing bar segment mounted adjacent to each other on the support structure, said first sealing bar segment and said second sealing bar segment presenting mutually inwardly facing side surfaces defining a gap therebetween;

said first sealing bar segment and said second sealing bar segment each being mounted to the support structure by a plurality of mounting devices including:

a first mounting device located adjacent one end of the segment, a second mounting device located near an opposite end of the segment and a third mounting device located between the first and second mounting devices, said mounting devices cooperating with each other to permit movement of their respective sealing bar segment relative to the support structure while preventing transverse movement of the side surfaces of the sealing bar segments relative to each other to thereby maintain a uniform gap therebetween through which a heated wire can pass without contacting the sealing bar segments.

2. The sealing bar assembly of claim 1 wherein the first and second mounting devices comprise spring loaded pins extending from the support structure to the sealing bar segments, and wherein the third mounting device provides a pivot to permit the ends of each sealing bar segment to pivot relative to each other.

3. The sealing bar assembly of claim 2 wherein the third mounting device is a spring-loaded pin and the sealing bar segment includes a receptor for rotatably accepting the pin.

4. The sealing bar assembly of claim 2 wherein the third mounting device comprises a pin having a ball head which is received in a socket in the sealing bar segment.

* * * * *